United States Patent
Krech, Jr. et al.

[11] Patent Number: 5,912,830
[45] Date of Patent: Jun. 15, 1999

[54] SYSTEM AND METHOD FOR CONDITIONALLY CALCULATING EXPONENTIAL VALUES IN A GEOMETRY ACCELERATOR

[75] Inventors: Alan S. Krech, Jr.; S Paul Tucker, both of Fort Collins, Colo.

[73] Assignee: Hewlett-Packard Co., Palo Alto, Calif.

[21] Appl. No.: 08/846,365

[22] Filed: Apr. 30, 1997

[51] Int. Cl.⁶ .......................................................... G06F 7/38

[52] U.S. Cl. ...................................... 364/753; 364/748.18

[58] Field of Search .......................... 364/748.11, 748.01, 364/753

[56] References Cited

U.S. PATENT DOCUMENTS

| | | | |
|---|---|---|---|
| 5,177,702 | 1/1993 | Lindsley | 364/753 |
| 5,195,052 | 3/1993 | Karim | 364/753 |

Primary Examiner—Tan V. Mai

[57] ABSTRACT

A method computes exponentials of a lighting equation in a geometry accelerator. In accordance with one aspect of the invention, the method includes the steps of receiving values for a first term "a" and a second term "x" of an exponential in the form $a^x$. The method then evaluates at least one of the first and second terms to determine whether it is an integer value. If the evaluating step determines that the at least one of the terms is an integer value, then the method sets a bit in a memory location. Thereafter, the method examines a bit in the memory location. If the bit is set, then the invention executes an integer exponentiation routine to calculate $a^x$ directly in the math core. If, however, the bit is not set, then the invention executes a floating point exponentiation routine to closely approximate the calculation of $a^x$.

17 Claims, 6 Drawing Sheets

SYSTEM AND METHOD FOR CONDITIONALLY CALCULATING EXPONENTIAL VALUES IN A GEOMETRY ACCELERATOR

BACKGROUND OF THE INVENTION

1. Field of the Invention

The present invention relates to computer graphics systems and, more particularly, to a computer graphics system utilizing a graphics accelerator having an enhanced logic and register structure to achieve enhanced performance.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and $\alpha$) color values of each vertex. Alpha is a transparency value. Additional primitive data may be used in specific applications. Rendering hardware interpolates the primitive data to compute the display screen pixels that represent each primitive, and the R, G, B and $\alpha$ values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. Additional data transmitted from the host computer to the geometry accelerator includes illumination parameters, clipping parameters and any other parameters needed to generate the graphics display.

Various techniques have been employed to improve the performance of geometry accelerators. These including pipelining, parallel processing, reducing redundancy, minimizing computations, etc. in a graphics accelerator. For example, conventional graphic systems are known to distribute the vertex data to the geometry accelerators in a manner that results in a non-uniform loading of the geometry accelerators. This variability in geometry accelerator utilization results in periods of time when one or more geometry accelerators are not processing vertex data when they are capable of doing so. Since the throughput of the graphics system is dependent upon the efficiency of the geometry accelerators, this inefficient use of the processing capabilities decreases the efficiency of the graphics system. In response to this shortcoming in the prior art, a solution was developed for distributing "chunks" of data to a parallel arrangement of geometry accelerators.

Another way of improving the throughput of a geometry accelerator is to minimize the overall amount of data that must be processed by it. For example, this can be done by minimizing redundancy in the data being sent to the geometry accelerator. While these and other techniques are known for improving the performance of geometry accelerators, further improvements are desired.

One area targeted for improvement relates to the lighting calculations. Specifically, when computing either the lighting from a surface having a specular reflection or the lighting associated with a spotlight, exponential calculations are performed. As is known, these calculations entail the computation of an exponential value in the form of "$a^x$". In OpenGL graphics, the lighting equation includes two exponential terms. One is used to define the spotlight effect and the other is used to define a specular term, known as shininess. For these two terms, the exponential term may be either an integer or floating point value. Floating point exponential values are much more complex, and therefore take much longer to calculate that do integer exponential values.

Accordingly, it is desired to provide a system that simplifies, reduces, or otherwise accelerates the various exponential calculations made by a geometry accelerator, without sacrificing the resulting image quality.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for computing exponentials of a lighting equation in a geometry accelerator. In accordance with one aspect of the invention, the method includes the steps of receiving values for a first term "a" and a second term "x" of an exponential in the form $a^x$. The method then evaluates at least one of the first and second terms to determine whether it is an integer value. If the evaluating step determines that the at least one of the terms is an integer value, then the method sets a bit in a memory location. Thereafter, the method examines a bit in the memory location. If the bit is set, then the invention executes an integer exponentiation routine to calculate $a^x$ directly in the math core. If, however, the bit is not set, then the invention executes a floating point exponentiation routine to closely approximate the calculation of $a^x$.

In accordance with a related aspect of the invention, a system computes exponentials of a lighting equation in a geometry accelerator. The system includes receiving means for receiving values for a first term "a" and a second term "x" of an exponential in the form $a^x$. Evaluating means evaluates at least one of the first and second terms to determine whether it is an integer value. Bit setting means respond to the evaluating means and operate to set a bit in a memory location. Thereafter, examining means examine the bit in the memory location. Integer means respond to the examining means, if the bit is set, to execute an integer exponentiation routine to calculate $a^x$ directly. Otherwise, floating point means respond to the examining means, if the bit is not set, to execute a floating point exponentiation routine to closely approximate the calculation of $a^x$.

DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated by the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
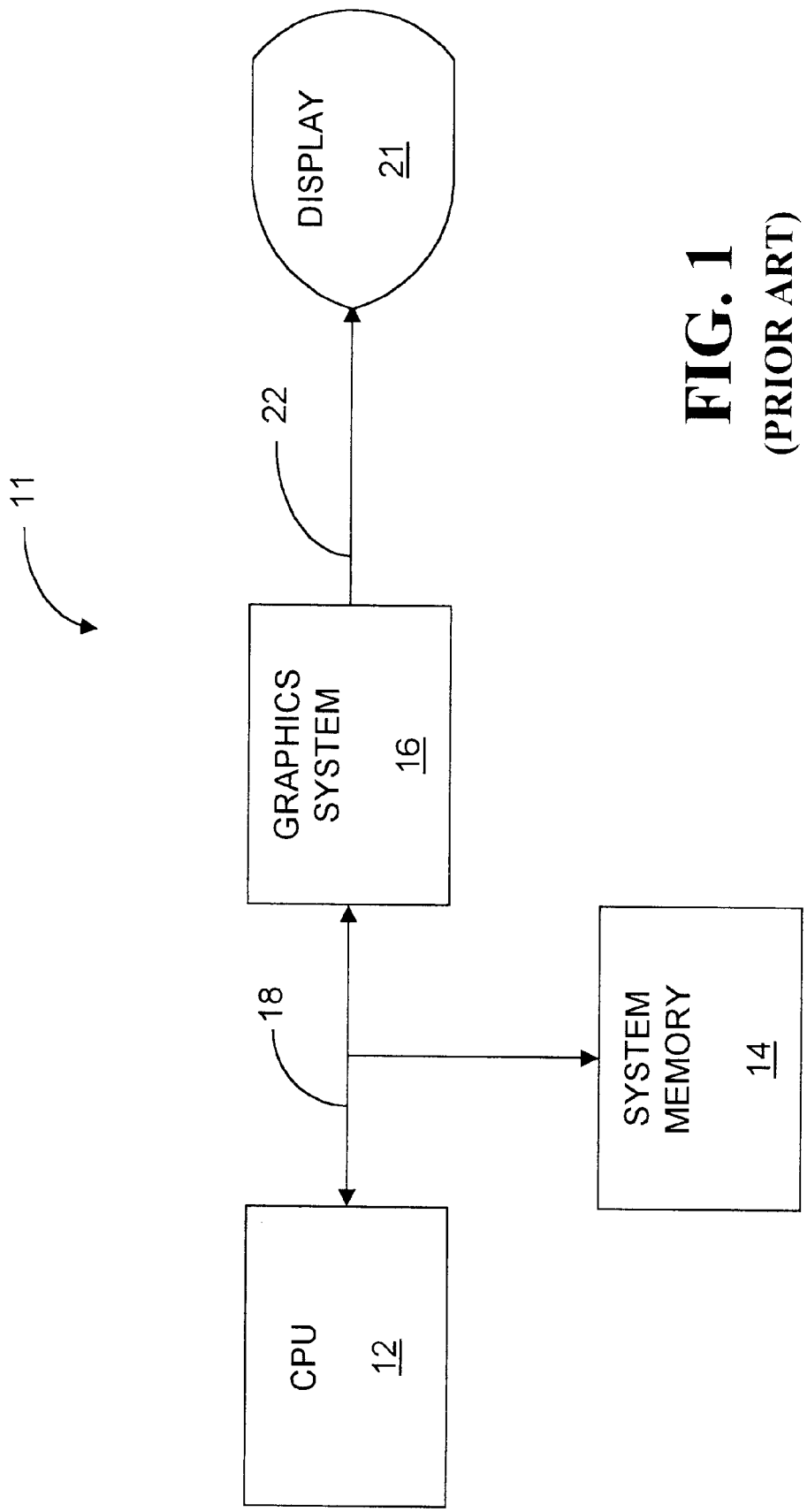
FIG. 1 illustrates a block diagram of a computer graphics system in accordance with the prior art.
Figure 2:
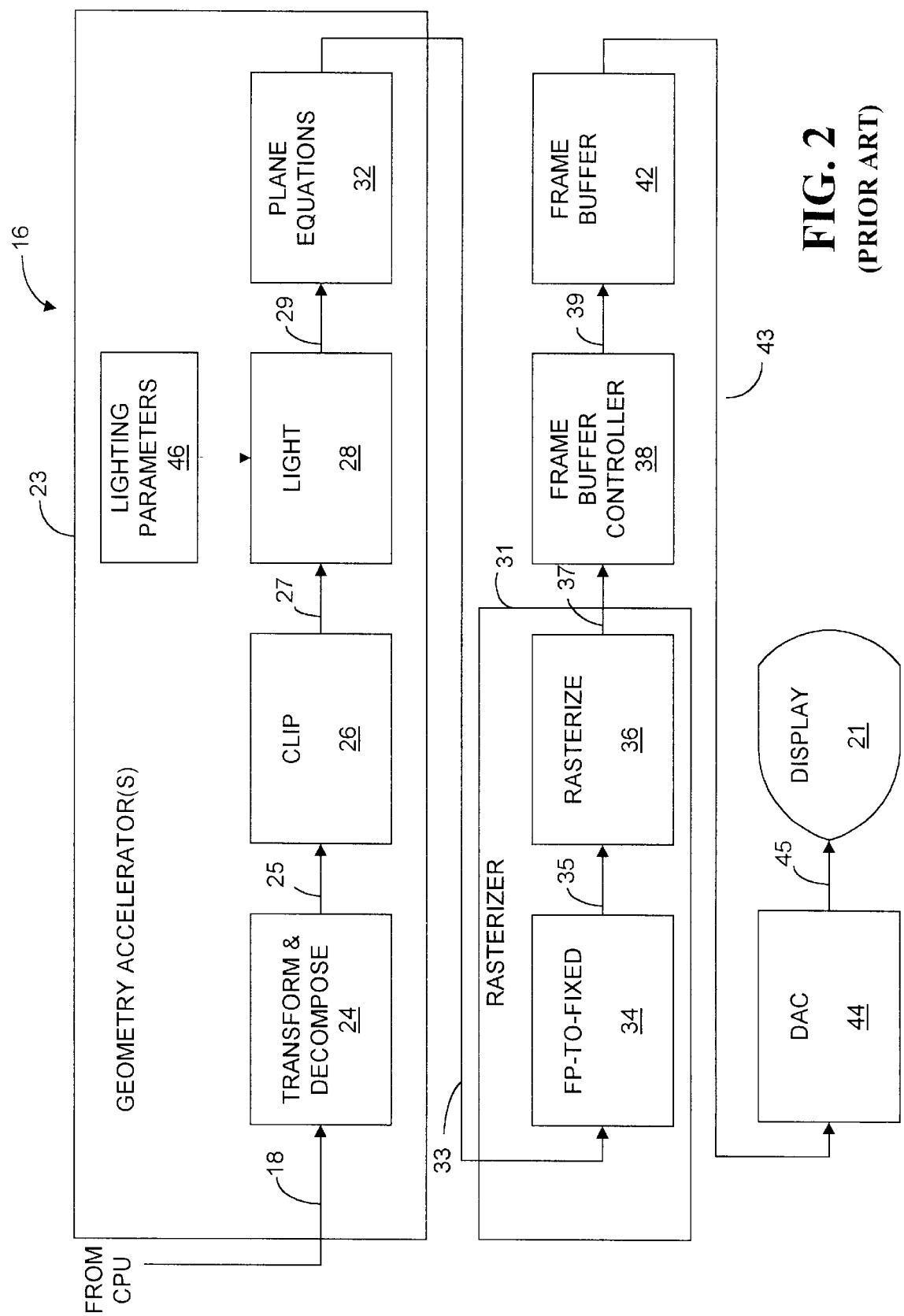
FIG. 2 illustrates a block diagram of a geometry accelerator and rasterizer of a computer graphics system in accordance with the prior art.

The basic components of a conventional computer graphics display system are shown in FIGS. 1 and 2. The computer graphics display system 16 comprises a geometry accelerator 23, a rasterizer 31, a frame buffer controller 38, and a frame buffer 42. The computer graphics display system 16 may also include texture mapping hardware (not shown). The geometry accelerator 23 receives vertex data from the host CPU 12 that defines the primitives (e.g., triangles) that make up the image to be displayed on the display 21.

The geometry accelerator 23 typically includes a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. Generally, all other vertex data is tossed or ignored. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the user relative to the object being displayed. This information is introduced to the lighting machine 28 through lighting parameters 46. While the lighting parameters 46 is illustrated as a separate block, it will be appreciated that this block is preferably implemented by a section of memory dedicated to storing the various lighting parameters (discussed below). The system CPU 12, through software, ultimately conveys the data for these parameters to the graphics accelerator 23 and its memory.

The plane equations component 32 generates floating point equations which define the image space within the vertices on the display screen. That is, the plane equations component 32 determines how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

As stated above, the operations of the geometry accelerator are computationally very intense because of the large volume of data transferred between the host computer and the geometry accelerator and because of the fact the geometry accelerator normally is required to perform several hundred million floating point calculations per second. In accordance with the present invention, it has been determined that the throughput of the computer graphics display system can be improved by reducing the number of mathematical operations that are normally executed in computing the lighting equation. More specifically, it has been determined that the throughput of the computer graphics display system can be improved by eliminating redundancy in the lighting equation calculations processed by the lighting machine 28.

While the foregoing has given a basic description of image generation and primitive manipulation in a graphics acceleration, it should be appreciated that many areas have been touched upon only briefly, for purposes of illustrating the invention herein. A more complete and detailed understanding will be appreciated by those skilled in the art, and is accessible from readily-available sources. For example, the graphics accelerator of the presently preferred embodiment is designed for operation in systems that employ OpenGL, which is a well known graphics application program interface (API). Indeed, there are many references which provide a more detailed understanding of graphics generally, and OpenGL specifically. One such reference is entitled OpenGL Programming Guide, by OpenGL Architecture Review Board—Jackie Neider, Tom Davis, and Mason Woo, an Addison-Wesley Publishing Company, 1993, which is hereby incorporated by reference.

As a final note, the preferred embodiment of the present invention is implemented in a custom integrated circuit, which serves as a single-chip geometry and lighting assist for a focused set of 3D primitives. Although the discussion above has focused upon triangle primitives, the chip performs geometric transformation, lighting, depth cue, and clipping calculations for quadrilaterals, triangles, vectors, and points. This chip receives modeling coordinate polygon and vector vertices from a host CPU 12, transforms vertex coordinates into screen space, determines vertex colors, decomposes quadrilaterals into triangles, and computes the triangle plane equations. It also performs 3D view clipping on the transformed primitives before sending the resulting triangles and vectors to a scan converter for rendering.

This custom integrated circuit supports many combinations of primitives and features, but as will be appreciated, when an application program uses an unusual feature, much of the computational work falls back on the host software. In those cases, the graphics pipeline is implemented in software and commands for the scan converter are passed through the custom integrated circuit. Alternatively, the software may supply device coordinate primitives to the custom integrated circuit to take advantage of its internal hardware that performs the plane equation work for the downstream scan conversion hardware.

Figure 3:
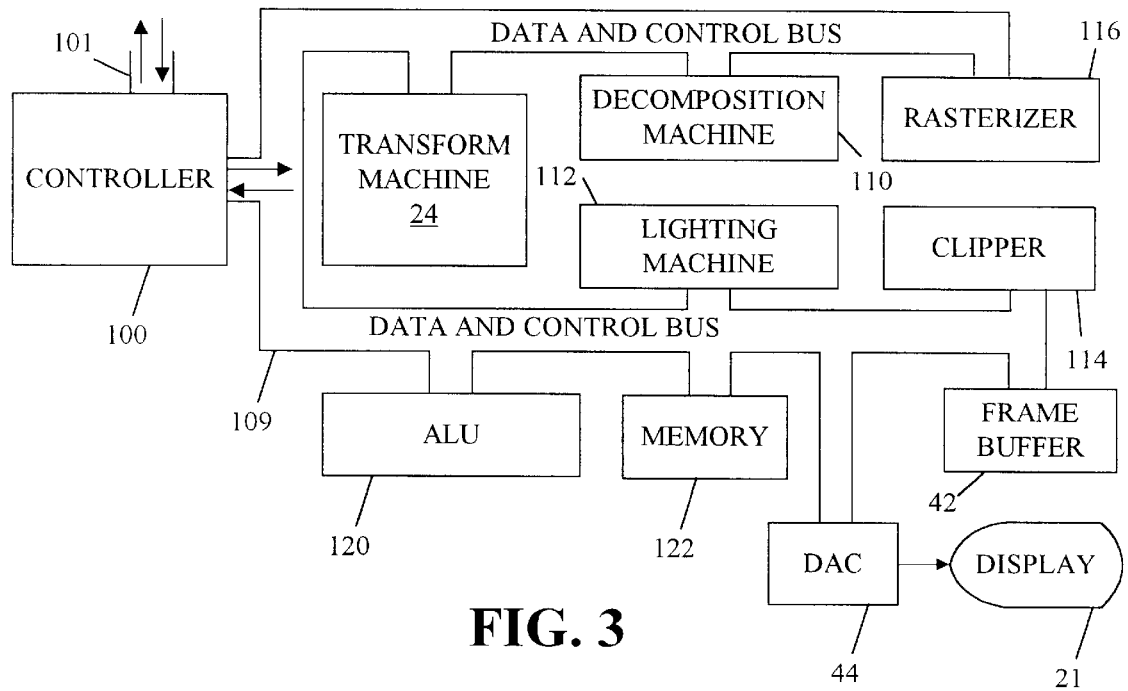
FIG. 3 is a block diagram of the geometry accelerator that illustrates various computational state machines and physical interconnections between the components.
Figure 4:
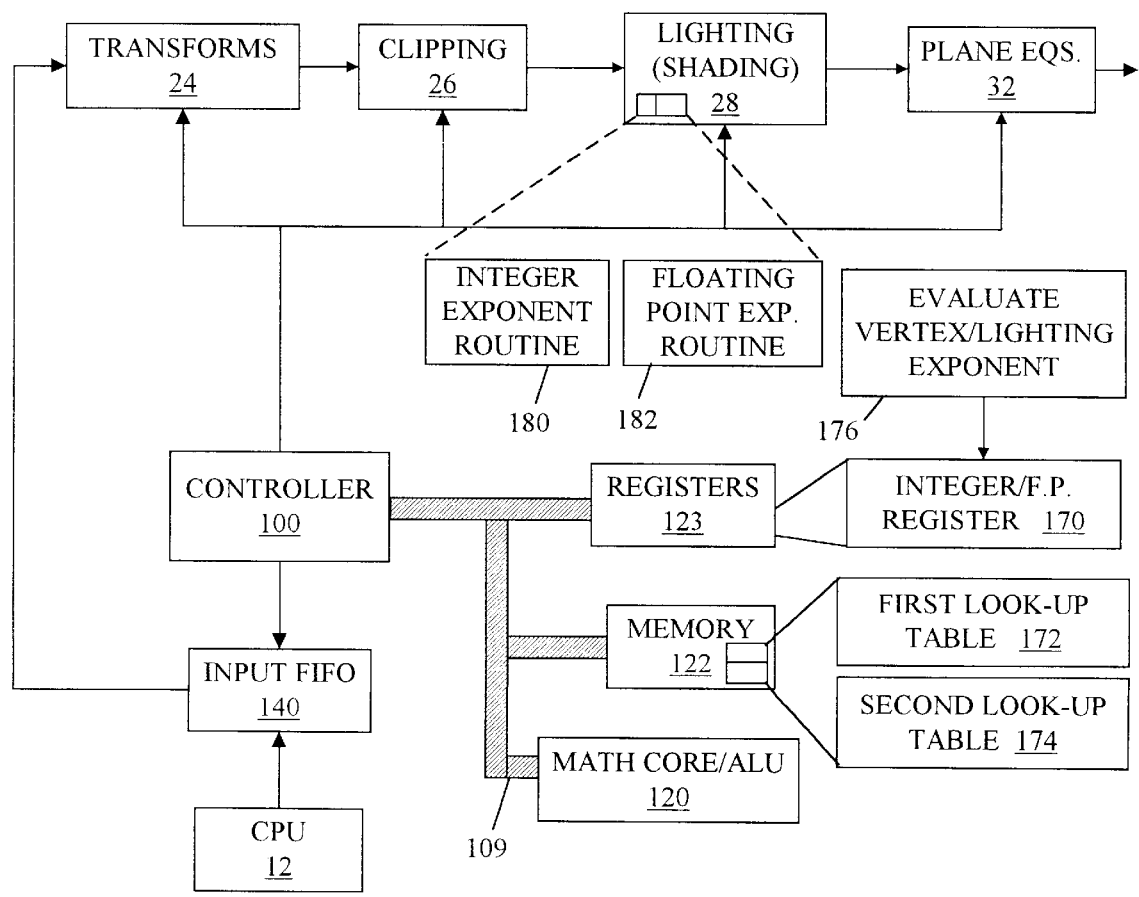
FIG. 4 is a block diagram illustrating the principal components of a geometry accelerator constructed in accordance with the present invention.

Having described the inventive aspects in broad terms, reference is now made to FIGS. 3 and 4, which better illustrate the preferred implementation of the present invention. While FIG. 2 illustrates a functional block diagram of the principal components in the graphics pipeline, FIG. 3 is a block diagram illustrating a more physical (as opposed to functional) layout of the pipeline. Specifically, the graphics accelerator chip includes a controller 100 that communicates with the CPU 12 (see FIG. 1) across a channel 101. The controller 100 communicates with the various state machines, internal memory 122 arithmetic logic unit (ALU) 120 and other devices by way of a data and control bus 109. More specifically, the transform state machine 24, decomposition state machine 110, lighting state machine 112, and clipper state machine 114 are all in communication with the controller 100 and each other by way of data and control bus 109. FIG. 3 also illustrates that the rasterizer 116, frame buffer 142, and digital to analog converter (DAC) 44 are also in communication across the same bus. It will be appreciated that, consistent with the concepts and teachings of the present invention, these devices may be implemented external to the geometric accelerator chip, and therefore are in communication with the chip via a separate control path.

Reference is made to FIG. 4, which illustrates system components pertinent to the present invention. More particularly, FIG. 4 is block diagram showing the primary components within a geometry accelerator that carries out the functional aspects of one feature of the present invention.

The transform 24, clipping 26, lighting (shading) 28, and plane equation 32 state machines are shown. A controller 100 coordinates and controls the operation of each of the individual state machines, as well as performing other management functions of the integrated circuit. In the preferred embodiment, the controller 100 also performs functions of address decoding and state management. A memory 122 and register set 123 are resources that are connected to the controller 100 by way of the control and data bus 109. An input FIFO 140 receives graphic data from an external CPU 12, and feeds this information both to the controller 100 and into the transform state machine 24. While the system generally illustrated in FIGS. 2, 3, and 4 is often referred to as a pipeline, it is appreciated by those skilled in the art that the machines or functions that comprise the pipeline do not necessarily have to be executed for each graphic primitive received. For example, the clipping state machine 26 need not be executed if all of the vertices defining a given graphic primitive are located on the display screen, or if all are located off the display screen, such that no part of the primitive would be visible to a user.

As is known, for a given graphic primitive, the computational processing by each of the state machines within the geometry accelerator need not necessarily be performed. For example, in certain instances the clipping state machine may be bypassed. Suppose three vertices defining a triangular graphic primitive are received and operated upon the transform state machine 24. Further assume that it is determined that each of the vertices defining the triangular primitive would be off the display 21, and therefore not visible to a user. In such an instance, it would be both unnecessary and a waste of resources to perform the various clipping and lighting computations on that graphic primitive. Instead, those routines could be bypassed (as indicated by dashed lines 150), and the primitive could be passed on down the pipeline for any further, relevant processing. Otherwise, a new primitive could be read in from the CPU, and operated on accordingly.

Similarly, the lighting 28 and plane equation 32 state machines need not always be executed. As previously described, the lighting machine 28 operates to compute the color a given vertex based upon lighting conditions and material properties. In the lighting equation utilized by the preferred embodiment, this involves relatively time consuming calculations. Likewise, the plane equation machine 32 operates to compute the slopes between two adjacent vertices of a graphic primitive. If, however, the two vertices are identically colored, the slope (color slope, or gradient) between the two will be zero, and therefore no computations need be performed by the plane equation machine 32.

Accordingly, based upon decisions made by the controller 100 from an examination of data received and transmitted through the input FIFO 140, one or more of the state machines within the graphics pipeline may be bypassed in order to expedite the processing on a given primitive, and therefore speed up the operation of the system.

In operation, the present invention provides a more efficient geometry accelerator 23 by improving the computations associated with the calculation of exponential values associated with specular reflection (shininess) and spotlight calculations. As is known, the lighting equation processed by OpenGL is:

$$\text{vertexcolor} = (Me + Ga*Ma) + \Sigma^n (Sf_1) * (Ma*La + Sf_2*Md*Ld + Sf_3*Ms*Ls);$$

wherein Me is a material emissivity, Ga is a global ambient, Ma is a material ambient component, La is a lighting ambient component, Md is a material diffuse component, Ld is a lighting diffuse component, Ms is a material specular component, Ls is a lighting specular component, n is the number of light sources, and $Sf_1$, $Sf_2$, and $Sf_3$ are scale factors.

In light of the foregoing equation, it is appreciated that a given vertex's color is determined by combining the various ambient, diffuse, and specular components of the material and lighting associated at that vertex. In this regard, the material ambient component is multiplied by the lighting ambient component (each of the red, green, and blue values), the material's diffuse component and the lighting diffuse component are multiplied, and the material's specular component is multiplied by the light's specular components. Each of these individual product terms are summed, and the summation is multiplied by a first scale factor $Sf_1$. This scale factor is, in essence, a measure of luminous intensity, and attenuates as the distance between the light source and point of illumination. More specifically, the first scale factor $SF_1$ is defined by the quadratic:

$$Sf_1 = 1/(kc + k1*d + kq*d^2) * (\text{Spotlight effect})$$

where d=the distance between the light's position and the vertex;

kc=a constant attenuation factor;

k1=a linear attenuation factor;

kq=a quadratic attenuation factor; and

Spotlight effect evaluates to one of three possible values, depending on whether the light is actually a spotlight and whether the vertex lies inside or outside the cone of illumination produced by the spotlight. These three possible values are: 1, if the light is not a spotlight, 0, if the light is a spotlight but the vertex lies outside the cone of illumination produced by the spotlight; and $(\max\{v \cdot d, 0\})^{exponent}$. In this term, $v = (v_x, v_y, v_z)$ is the unit vector that points from the spotlight to the vertex, and $d = (d_x, d_y, d_z)$ is the spotlight's direction, assuming the light is a spotlight and the vertex lies inside the cone of the illumination produced by the spotlight. The dot product of the two vectors v and d varies as the cosine of the angle between them (See FIGS. 6A and 6B). Therefore, objects directly in line get maximum illumination, while objects off the axis have their illumination attenuate as the cosine of the angle.

The diffuse term (Md*Ld) and the specular term (Ms*Ls) are also weighted by scale factors $Sf_2$ and $Sf_3$. The diffuse term takes into account whether light falls directly on the vertex, the diffuse color of the light, and the diffuse material property. As a result, $Sf_2$ is defined as $\max\{l \cdot n, 0\}$, where $l = (l_x, l_y, l_z)$ is the unit vector that points from the vertex to the light position, and $n = (n_x, n_y, n_z)$ is the unit normal vector at the vertex. Similarly, the specular term also depends on whether light falls directly on the vertex. If l.n is less than or equal to zero, there is no specular component at the vertex. If however, there is a specular component, the scale factor $Sf_3$ is calculated as follows:

$$Sf_3 = (\max\{s \cdot n\})^{shininess},$$

where $s = (s_x, s_y, s_z)$ is generally derived from the sum of two vectors that point between (1) the vertex and the light position and (2) the vertex and the viewpoint, and n is the unit normal vector defined above. Shininess is a value/attribute defining a material's shininess.

In keeping with the description of the preferred embodiment, the present invention improves the computations associated with the calculation of exponential values associated with the shininess value and spotlight calculations. More specifically, these two exponential values are often floating point values. As is known, floating point exponents are much more computationally intensive than integer exponents are, and therefore slow down the processing of the graphic image being displayed (assuming spotlights and/or specular reflections are present). The present invention achieves a two-fold performance enhancement. In accordance with one aspect of the invention, the geometry accelerator of the preferred embodiment executes an inventive routine that utilizes look-up tables to approximate the computation of a floating point exponent in the form of "$a^x$". Discussed in greater detail below, this routine achieves a very close approximation to that which would be achieved by direct computation, but completes the computation in a much shorter amount of time.

In accordance with another aspect of the present invention, the geometry accelerator of the preferred embodiment further speeds the graphic processing by evaluating the exponent to verify whether, indeed, it is a floating point exponential. While the exponent is often a true floating point value, it is sometimes an integer value, which may be computed more quickly than a floating point value. In accordance with the preferred embodiment, the computation of an integer exponential requires approximately twenty four states, while the computation of a floating point exponential (according to the preferred routine utilizing look-up tables) requires approximately forty eight states. Therefore, the computation may be cut in half when ever integer computation may be performed in place of the floating point computation.

In keeping with the description of FIG. 4, significant to the present invention are the controller 100, registers 123, memory 122, and math core/ALU 120. More significantly, within the register set 123 is an integer/floating point register 170. By referencing this register, the system decides whether to execute an integer exponentiation routine 180 or a floating point exponentiation routine 182. These routines 180, 182 are illustrated as forming part of the lighting machine 28. Another portion 176 of the geometry accelerator 23 operates to evaluate vertex and lighting exponents and clear or set the appropriate bits in the integer/floating point register 170, illustrated in TABLE 1 below.

TABLE 1

| Bit 15 | Bit 14 | Bit 13 | Bit 12 | Bit 11 | Bit 10 | Bit 9 | Bit 8 | Bit 7 | Bit 6 | Bit 5 | Bit 4 | Bit 3 | Bit 2 | Bit 1 | Bit 0 |
|---|---|---|---|---|---|---|---|---|---|---|---|---|---|---|---|
| back shininess | | | | front shininess | | | | | Spot Light Exponents | | | | | | |
| V3 | V3 | V1 | V0 | V3 | V2 | V1 | V0 | L7 | L6 | L5 | L4 | L3 | L2 | L1 | L0 |

As depicted in TABLE 1, the integer/floating point register 170 is preferably implemented as a sixteen bit register. Four of the bits are dedicated to the shininess of the front portion of primitive vertices (up to four vertices per primitive). Likewise four of the bits are dedicated to the shininess of the back portion of the up to four primitive vertices. Finally, eight of the bits are dedicated to the spot light exponent of the up to eight light sources (L0–L7).

By way of example, suppose the graphics software/API designates the fronts of vertices V0 and V1 as having a floating point shininess, while the values of the remaining vertices are designated as having integer shininess. Then the routine designated as block 176 may clear (or set) bits V0 and V1 of the object front, while clearing all the remaining vertex bits. In this regard, whether the system operates to set or clear a bit to reflect an integer or floating point value is purely a matter of design choice, and either way may be implemented in accordance with the concepts and teachings of the present invention. Likewise, suppose that the spot light exponent for light source number two is a floating point number, while the spot light exponents for all remaining light sources are integer values. In this scenario, the routine designated as block 176 may clear (or set) the L2 bit, and set (or clear) all remaining light source bits L0, L1, and L3–L7.

In executing the mathematical operations for the light equation, the controller 100 can access the integer/floating point register 170 to determine which of the exponentiation computations may be executed in accordance with an integer exponent routine 180, and which must be executed by a floating point exponent routine 182. By executing the integer exponent routine 180 whenever possible, the system achieves enhanced throughput.

Figure 6:
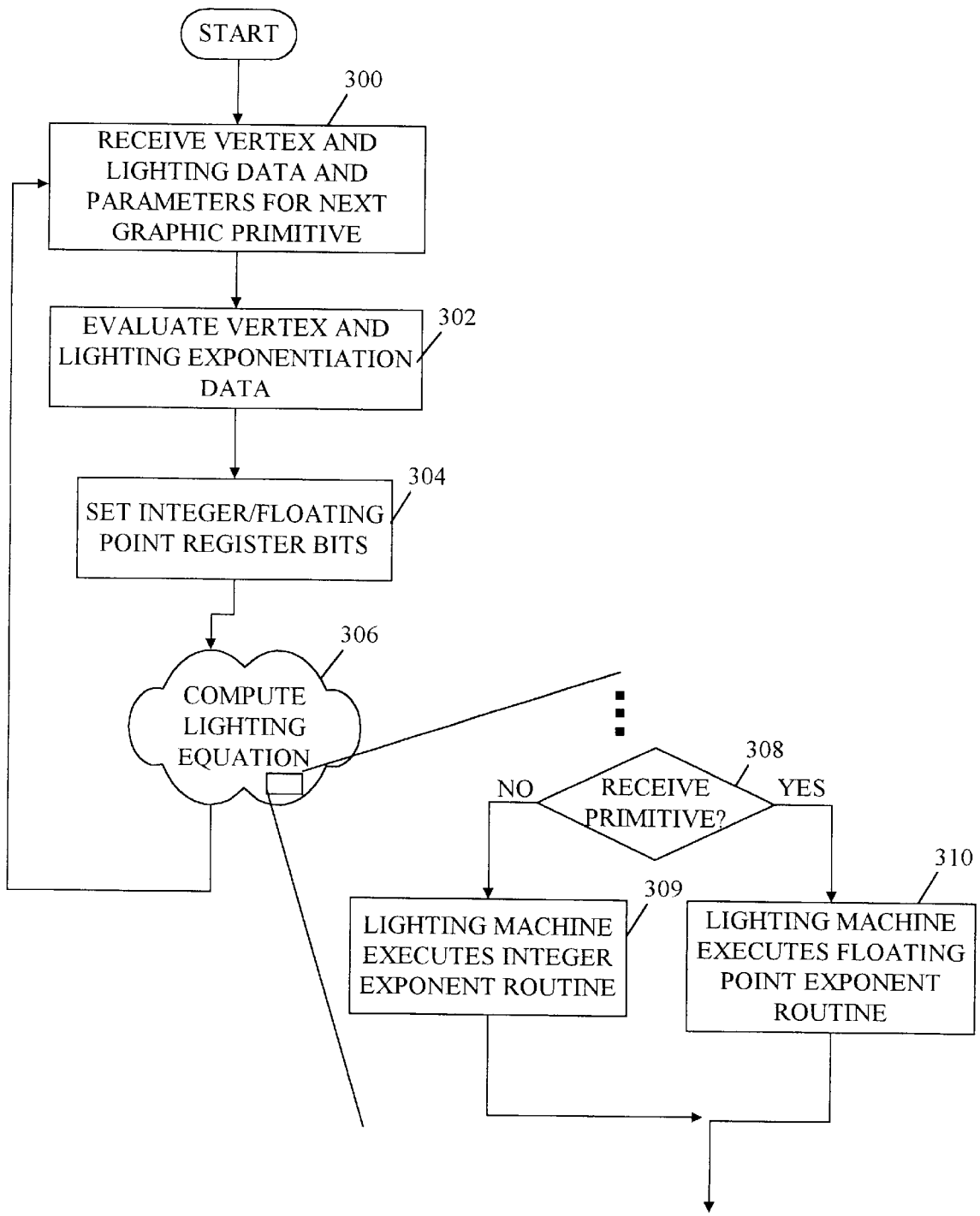
FIG. 6 is a software flowchart illustrating the top-level operation associated with the method of determining whether to execute a floating point or integer exponentiation computation.

In this regard, reference is made briefly to FIG. 6, which is a software flowchart depicting the top-level operation of the geometry accelerator, in computing the exponentiation terms of the lighting equation. At step 300, the geometry accelerator 23 receives vertex at lighting data and other parameters for the next graphic primitive that is to be operated upon. Preferably, the geometry accelerator operates on graphics primitives one at a time, wherein each primitive may be defined by as many as four vertices. Thus, the lighting equation previously discussed is computed for each primitive vertex. The invention, therefore, evaluates vertex and is lighting exponentiation data (step 302) for each vertex of a graphic primitive. For both the front and back facing material properties the invention evaluates the shininess component that is received from the software or the application program interface (API). The invention evaluates the spotlight exponentiation data for each light source. Like the vertex shininess parameter, the spotlight exponent will be provided from the software or graphics API. The invention then sets the integer/floating point register bits (step 304). As discussed above in connection with Table 1, this register provides a bit for each vertex, both front facing and back facing properties, as well as a bit for each light source. If the evaluation step of step 302 determines that the shininess component for any given vertex is a floating point (as opposed to integer) value, then the invention will clear (or set) the associated bit within the integer/floating point register. Likewise, the invention will clear (or set) any of the light source bits (L0-L7), which the evaluation step 302 determines to be a floating point value.

Then, at step 306, the system computes the lighting equation. For purposes of illustration and ease of understanding, FIG. 6 has illustrated these steps as occurring sequentially. However, it will be appreciated, particularly in light of the description and figure previously described that these steps may be implemented by distinct routines or state machines. Four purposes of illustrating the significant aspects of the present invention, a small portion of the lighting equation computation step is broken out as steps 308, 309, and 310. These steps are relevant to the portion of the lighting equation that relates to the computation of the exponential values associated with shininess (specular reflection) and spotlights. In OpenGL, these values may be represented as floating point numbers, but do not have to be so represented. Accordingly, at step 308, the invention evaluates the integer/floating point register bits to determine whether the relevant vertex or lighting bits are clear. If not, then the system recognizes that the particular material or lighting value is an integer value, as opposed to a floating point value, and it branches to step 309, where it computes the exponent in accordance with an integer exponentiation routine. If, however, the relevant bits are set, then the system branches to step 310 where it computes the exponentiation in accordance with a floating point routine, which will be described in more detail below.

Significantly, the integer routine operates on the data knowing that the data values are integer values. In the preferred embodiment, this computation takes about half the time required for the floating point computation. Therefore, recognizing integer values allows the invention to achieve significant time savings and therefore improved performance.

Turning now to the execution of the floating point exponent routine 182, reference is again made briefly to FIG. 4. In accordance with another aspect of the present invention, the geometry accelerator of the preferred embodiment implements a novel floating point exponentiation routine, which achieves improved performance over routines previously known. More specifically, the routine 182 is either called or implemented within the lighting machine 28 of the geometry accelerator. During the execution of this routine, the math core 120 accesses data that is stored in look up tables 172 and 173, which may be in turn stored in memory 122.

To better illustrate the operation in computation of the improved floating point exponent calculation routine 182, the invention recognizes the following mathematical relationship. Specifically, that an exponential in the form of $a^x = 2^{(x \log 2(a))}$. This equation is, in turn, approximated in accordance with the following six steps:

step 1: compute the base 2 log of a using a first look-up table;

step 2: multiply the result of step 1 by the exponent x;

step 3: break the result of step 2 into integer and fractional components;

step 4: compute $2^{(fractional\ component)}$ using a second look-up table;

step 5: compute $2^{integer}$; and step 6: multiply the results of steps 4 and 5 to obtain the final result.

In regard to step 1, the invention utilizes a first look up table 172 to compute the base 2 log of a. In the preferred embodiment, this table is a seventeen entry look up table, which has seventeen indexed values (0–16), and an IEEE floating point value associated with each index value. This first look up table 172 is also referred to as the log table, and an expanded representation of this first look up table 172 is presented immediately below in Table 2.

TABLE 2

| Most Significant Bits of Mantissa | Index Value | IEEE Floating Point Value (hex) | Decimal Equivalent |
| --- | --- | --- | --- |
| 0000 | 0 | 0xBF800000 | −1 |
| 0001 | 1 | 0xBF699C06 | −0.912537 |
| 0010 | 2 | 0xBF547FCC | −0.830075 |
| 0011 | 3 | 0xBF4087DB | −0.752073 |
| 0100 | 4 | 0xBF2D9620 | −0.678872 |
| 0101 | 5 | 0xBF1B911D | −0.607683 |
| 0110 | 6 | 0xBF0A62AA | −0.540568 |
| 0111 | 7 | 0xBEF3EFAE | −0.476438 |
| 1000 | 8 | 0xBED47FDC | −0.415038 |
| 1001 | 9 | 0xBEB65882 | −0.356144 |
| 1010 | 10 | 0xBE995FEE | −0.299560 |
| 1011 | 11 | 0xBE7AFEA4 | −0.245112 |
| 1100 | 12 | 0xBE4544BB | −0.192645 |
| 1101 | 13 | 0xBE116D6E | −0.142019 |
| 1110 | 14 | 0xBDBEAFEE | −0.093109 |
| 1111 | 15 | 0xBD3B9CFA | −0.045804 |
|  | 16 | 0x00000000 | 0 |

Table 2 is presented in expanded format for purposes of illustration and discussion. The preferred embodiment of the present invention accesses and indexes the data values stored in Table 2 by evaluating the four most significant bits of the mantissa portion of the value of a. In this regard, it is appreciated that the preferred embodiment of the present invention implements and manipulates numbers in accordance with the IEEE 754 standard format for floating point numbers. In accordance with this IEEE standard, floating point numbers are represented in 32 bits, wherein the first bit is a sign bit, the following eight bits are an exponent, and the last 23 bits are the mantissa. For purposes of illustration, the first column of Table 2 presented above shows the four most significant bits of the mantissa of a. Column 2 shows the corresponding table index value. The third column shows the IEEE floating point value (in hex) of the data that is actually stored and retrieved from this table, corresponding to each index value. Finally, the fourth column of Table 2 shows the decimal equivalent to each of the IEEE floating point values. The table values utilized reflect the understanding that the value of a (which is the computed dot product previously described) will range between 0 and 1. Thus, the value of the expression a will range between 0 and 1 as well. Accordingly, the number is readily normalized and stored so that the mantissa value corresponding to a is directly proportional to the value of a. Values computed in accordance with the equation log2(a) were precalculated and stored in the table.

In this regard, a design choice/trade-off was made, wherein accuracy in the results and table size were evaluated. More specifically, the larger the look up table, the more values it could hold, and therefore, the greater the resolution of log2(a), and accordingly greater accuracy in the results could be obtained. However, a larger table size requires more memory space, and therefore more gates in the hardware. During this design phase, it was determined that the seventeen entry table of FIG. 2 provides very accurate results and it is therefore preferred.

Figure 5:
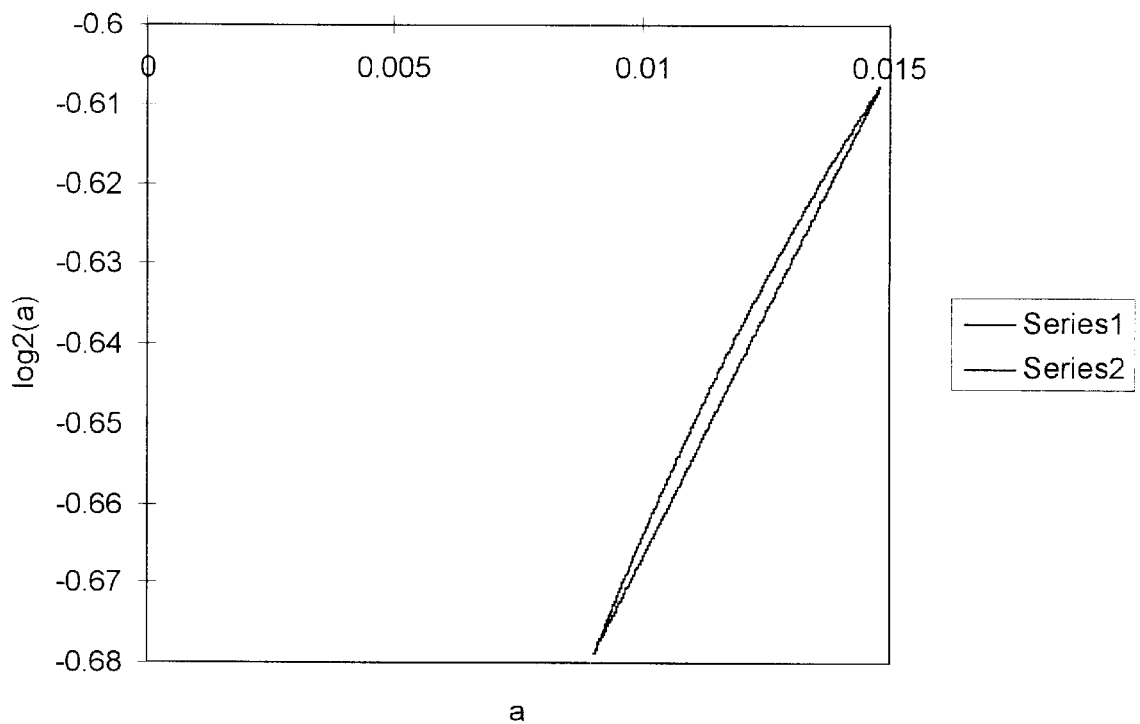
FIG. 5 is a graph illustrating the mathematical approximation realized by the first look-up table.

As will be discussed in more detail below, the present invention employs a linear interpolation between two consecutive values and the look up table 172. FIG. 5 is graph that illustrates the accuracy obtained by the present invention. More specifically, the table entries corresponding to index values 4 and 5 are plotted in FIG. 5. FIG. 5 shows two closely-spaced lines extending upwardly and to the right, and which intersect at their end points. The lowermost end point corresponds to the table value at the index value of four, which is minus −0.678872 (in decimal) The uppermost intersecting end point corresponds to the next table value (indexed value 5), which is 0.607683 (in decimal). The rightmost line of the graph of FIG. 5 is a straight line that reflects the linear interpolation between the two end points, while the leftmost line is a plot of the actual computation of the base 2 log (a). As is illustrated in FIG. 5, the distance between the two line is relatively small. As could be further appreciated, by doubling the size, and therefore the resolution of the look up table, greater accuracy in the linear interpolation may be obtained.

In keeping with the description of step 1 of the inventive method, the system utilizes the first four bits of the mantissa of a to access a first value in the first look up table 172. The system of the preferred embodiment retrieves from the able, not only the value corresponding to the index value, but also the next consecutive value. For example, if the first four bits of the mantissa are 0100, then the system would retrieve the two values from the first table corresponding to the end points that are graphically illustrated in FIG. 5.

The system then utilizes the following bits of the mantissa to perform the linear interpolation between the two values. By way of illustration, if all remaining mantissa bits were 0, then the interpolated value would be the same as the first value retrieved from the table. Likewise if all remaining mantissa bits were 1, then the interpolation value would be extremely close to the second value retrieved from the table.

It is, thus, understood that a seventeen (as opposed to sixteen) entry look up table is needed in order to fully utilize the first four bits of the mantissa. It will also be appreciated that, when performing the linear interpolation, the system must first convert the nineteen least significant bits of the mantissa into a 32 bit value that is represented in accordance with the IEEE floating point standard, so that the math core can properly operate on the value.

In keeping with the description of the method, once the linear interpolation is complete, the system obtains an intermediate result that is a very close approximation of the base 2 log of a. It multiplies this intermediate result by the value of x. Assuming that the resulting value is greater than 1, and therefore has both an integer and fractional portion, the system splits the resulting value into an integer and fractional components. It then utilizes a second look up table 174 to compute $2^{(fractional\ component)}$. Like the first look up table, this second look up table is a seventeen entry table, and an expanded view of the table utilized in the preferred embodiment is provided in Table 3 below.

TABLE 3

| Most Significant Bits of Mantissa | Index Value | IEEE Floating Point Value (hex) | Decimal Equivalent |
|---|---|---|---|
| 0000 | 0 | 0x3F800000 | 1 |
| 0001 | 1 | 0x3FF52578 | 1.915206 |
| 0010 | 2 | 0x3FEAC0C8 | 1.834008 |
| 0011 | 3 | 0x3FE0CCDE | 1.756252 |
| 0100 | 4 | 0x3FD744F6 | 1.681792 |
| 0101 | 5 | 0x3FCE2489 | 1.610490 |
| 0110 | 6 | 0x3FC56723 | 1.542210 |
| 0111 | 7 | 0x3FBD08A2 | 1.476826 |
| 1000 | 8 | 0x3FB504F7 | 1.414213 |
| 1001 | 9 | 0x3FAD5843 | 1.354256 |
| 1010 | 10 | 0x3FA5FEDA | 1.296840 |
| 1011 | 11 | 0x3F9EF534 | 1.241858 |
| 1100 | 12 | 0x3F9837F8 | 1.189208 |
| 1101 | 13 | 0x3F91C3CE | 1.138789 |
| 1110 | 14 | 0x3F8B95C4 | 1.090508 |
| 1111 | 15 | 0x3F85AAC5 | 1.044274 |
|  | 16 | 0x3F800000 | 1 |

The second look up table is accessed and indexed in a manner similar to that of the first look up table. Specifically, the fractional component is represented in IEEE floating point format, and the system utilizes the first four bits of the mantissa value to index the table. Seventeen values are precalculated and stored in the table in accordance with the equation $2^{(fractional\ component)}$. Also like in step 1, the system retrieves two values from the table and performs a linear interpretation between the two. Thus, if the four most significant mantissa bits are 1000, the system will retrieve the values associated with the eighth and ninth index values, which are 1.414213 and 1.354256, respectively. Then, the system utilizes the math core 120 to directly compute $2^{integer}$. Since this is a integer exponentiation, the system may directly compute the resulting value utilizing an integer exponentiation routine 180. Thereafter the interpolation of the second look up table and the direct computation of $2^{integer}$ are multiplied together to obtain a final result. This final result is a very close approximation of the exponentiation of $a^x$.

Figure 7:
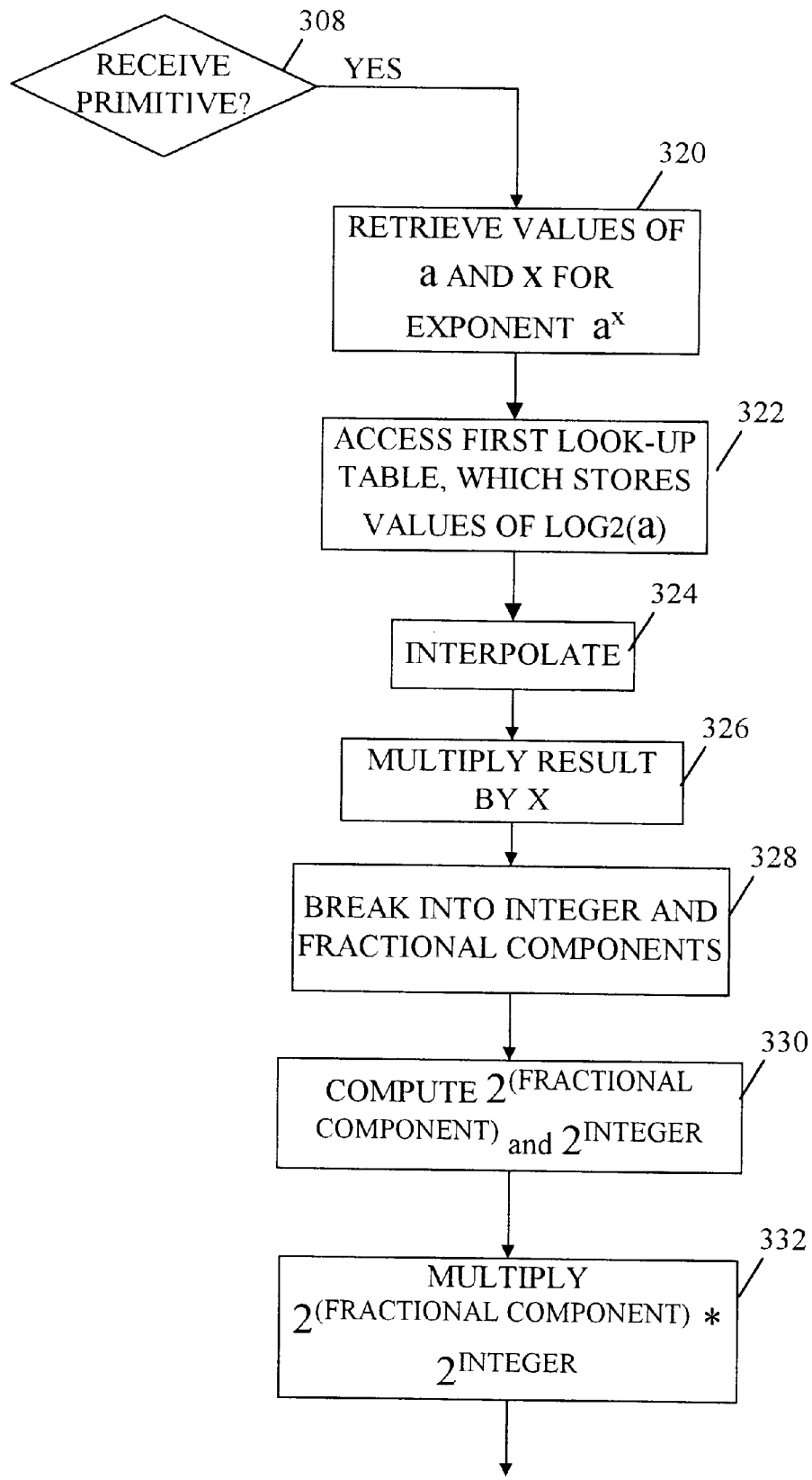
FIG. 7 is a software flowchart illustrating the top-level operation associated with the calculation of the floating point exponentiation computation.

A numerical example illustrating the computation of a floating point exponent in accordance with the invention will be provided below. First, reference is made briefly to FIG. 7, which is a software flow chart illustrating the top-level operation of this aspect of the invention. More specifically, FIG. 7 illustrates in more detail the step broadly denoted as step 310 in FIG. 6. In operation, when the system evaluates the integer/floating point control register and determines that a particular bit is cleared (step 308), it recognizes that it must compute a floating point exponent, and does so in accordance with the invention. In this regard, the system retrieves the values of a (previously computed) and x for computing the exponential $a^x$ (step 320). These values are typically stored in the memory 122 (see FIGS. 3 and 4), having been previously generated or computed by the graphics API. Using the value of a, the invention accesses a first look up table which stores the value for the log2(a) (step 322). Preferably, the invention indexes the first table and retrieves two consecutive values, and performs a linear interpolation between the two consecutive values to obtain a more accurate numerical result (step 324). The system then multiplies this result by the value of x at step 326. At step 328, the system breaks this result into integer and fractional components. The system then computes the values for both $2^{(fractional\ component)}$ and $2^{integer}$. Finally, in step 332, the system multiplies together the results of $2^{fraction\ component}$ and $2^{integer}$, to obtain a final result.

It should be appreciated that the steps of evaluating a number to determine whether it is a floating point or integer value (see step 302 of FIG. 6) may be executed in accordance with routines or methods known in the prior art, and therefore this step has not been discussed in detail herein. Likewise, the direct computation of the integer exponent routine 180 (see FIG. 4) has not been described, as this routine may be employed in ways known in the prior art.

NUMERICAL EXAMPLE

To illustrate the calculation of a floating point exponential value in accordance with the method of the preferred embodiment of the present invention, consider by way of example the computation of $0.784^{57.27}$. That is, in the expression $a^x$, a=0.784 and x=57.27. Direct calculator computation of this expression ($0.784^{57.27}$) results in a final value of $8.861 \times 10^{-7}$. Therefore, computation of this expression by way of the present invention yields a final value that approximates the calculator computation.

As discussed above, the preferred embodiment approximates exponential floating point expressions by recognizing that $a^x = 2^{(x*log2(a))}$. This equation is in turn approximated in accordance with the following six steps:

step 1: compute the base 2 log of a using a first look-up table;
step 2: multiply the result of step 1 by the exponent x;
step 3: break the result of step 2 into integer and fractional components;
step 4: compute $2^{(fractional\ component)}$ using a second look-up table;
step 5: compute $2^{integer}$; and
step 6: multiply the results of steps 4 and 5 to obtain the final result.

Each of these steps will be illustrated and discussed immediately below, in connection with the example of $a^x$, where a=0.784 and x=57.27.

Step 1

As a first step, and one which will inherently occur, is the representation of the floating point value of 0.784 in IEEE 754 Standard format. Accordingly, ---
a = 0.784 = 0011 1111 0100 1000 1011 0100 0011 1001 (binary)
= 3F48B439 (hex)
---

As is known, pursuant to the IEEE 754 Standard, the first bit is a sign bit, the next eight bits represent the exponent, and the final 23 bits represent the mantissa. Therefore, for the 0.784 value:

sign=0;
exponent=0111 1110 (binary), or 7E (hex);
mantissa=100 1000 1011 0100 0011 1001 (binary), or 48B439 (hex).

In accordance with the preferred embodiment, the first four bits of the mantissa (1001) are used as the indexing pointer into the first (or log2(a)) look-up table (TABLE 2). These four bits equate to the decimal value of 9, and therefore point to the ninth entry of the first look-up table. The value stored in this location is BEB65882 (hex). Recognizing that this is a value stored in accordance with the IEEE 754 Standard format, it equates to a decimal value of −0.356144.

Since the first four bits of the mantissa provide only an approximation of the actual mantissa value, further resolution is achieved by way of linear interpolation. To achieve the linear interpolation, the next (10th) location value in the look-up table is also retrieved. The value stored in this location is BE995FEE (hex), which equates to a decimal value of −0.299560. The remaining 19 least significant bits are used for the linear interpolation. Note, however, that the interpolation could be achieved without utilizing all of the 19 remaining bits. However, the more bits utilized for this step, the greater the accuracy of the final result.

In this regard, the 19 least significant bits of the mantissa are: 000 1011 0100 0011 1001 (binary), or (0B439). Since the math core of the geometry accelerator 23 constructed in accordance with the preferred embodiment carries out mathematical operations on numbers that are formatted in accordance with the IEEE 754 Standard, this 19 bit binary value must first be normalized (converted) into IEEE 754 Standard format. Carrying out this normalization results in a value of 0011 1101 1011 0100 0011 1001 0000 0000 (binary), or 3DB43900 (hex), which equates to a decimal value of 0.08799. This value is also referred to as the multiplier value, which is used in the interpolation equation.

More specifically, the interpolation equation is:

(1−multiplier) * (lower looked-up value)+multiplier * top look-up value.

Therefore,

---
log2(.784) ≈ (1 − 0.08799) * (−0.356144) + 0.08799 * (−0.299560)
≈ (0.91201) * (−0.356144) + (−0.026358)
≈ −0.324806 + (−0.026358)
log2(.784) ≈ −0.351165.
---

Step 2

Having computed (approximated) the value of log2(a), using a first look-up table, the second step computes multiplies the result of step 1 by x. Execution this step yields 57.27 * (−0.351165)=−20.111.

Step 3

In accordance with the third step, the result of step 2 (−20.111) is broken into fractional and integer component parts. Again recognizing the IEEE 754 Standard format, the value −20.111, or C1A0E3BD (hex), is readily broken into its component parts by the math core of the geometry accelerator, wherein the integer part (−20)=C1A00000 and the basis for the fractional part (0.111) is E3BD.

Step 4

Next, the value $2^{(fractional\ component)}$ is computed using a second look-up table (TABLE 2). This table is indexed using the four most significant bits of the mantissa, which are 1110 (binary), or E (hex). Using these bits indexes to the 14th location of the second table, where the value 1.09058 is stored. Like before, the preferred embodiment also retrieves the next consecutive table location (the 15th location), and performs a linear interpolation between the two, to more accurately compute the value $2^{(fractional\ component)}$. The value stored at the 15th location is 1.044274.

As described in connection with the linear interpolation of the first table values in step 1, the least significant bits of the mantissa are used in performing the linear interpolation of step 4. First these bits are normalized into the appropriate floating point format (IEEE 754 Standard) so that they may be handled by the math core. This normalization results in a multiplier of 3EDEB8000 (Hex), which is a decimal value of 0.43457. Using the same linear interpolation equation from above:

---
$2^{(fract.\ comp.)}$ ≈ (1 − multiplier) * (lower table value) + multiplier * (upper table value)
≈ (1 − 0.43457) * (1.090508) + 0.43457 * (1.044274)
≈ (0.56543) * (1.090508) + 0.453810
≈ 0.6166059 + 0.453810
$2^{(fract.\ comp.)}$ ≈ 1.070416
---

Step 5

Next, the value $2^{integer}$ is computed. Since this exponential value is an integer value, is may be directly computed by the math core, by way of a shifting operation (since it is a base 2 exponentiation). Thus, $2^{(-20)}=9.5367\times10^{-7}$.

Step 6

Finally, a final result is obtained by multiplying the results of steps 4 and 5.

Thus, $$2^{-20}*2^{-0.111}=2^{-20}*(\frac{1}{2}^{0.111})$$

Substituting the computed and approximated values for $2^{-20}$ and $2^{0.111}$ yields $9.5367\times10^{-7}$ * $(1/1.07042)=9.5367\times10^{-7}$ * $0.93421=8.90928\times10^{-7}$.

Evaluating the Results

Recall that the result obtained by direct calculation was $8.861\times10^{-7}$. The difference between this result and the value obtained through the method of the preferred embodiment is a difference of 0.54%, which is well within the error specification of OpenGL.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for computing exponentials of a lighting equation in a geometry accelerator comprising the steps of:
   (a) receiving values for a first term "a" and a second term "x" of an exponential in the form a;
   (b) evaluating at least one of the first and second terms to determine whether the at least one term is an integer value;
   (c) if the evaluating step determines that the at least one of the terms is an integer value, then setting a bit in a memory location;
   (d) examining a bit in the memory location;
   (e) if the bit is set, then executing an integer exponentiation routine to calculate $a^x$;
   (f) if the bit is not set, then executing a floating point exponentiation routine to closely approximate the calculation of $a^x$; and
   (g) using the calculated result of $a^x$ to compute the lighting equation in the geometry accelerator.

2. The method as defined in claim 1, wherein the memory location is part of a control register.

3. The method as defined in claim 2, wherein the control register includes a plurality of bits.

4. The method as defined in claim 3, wherein the register includes bits representative of vertex shininess and lighting spotlights.

5. The method as defined in claim 1, wherein the step (b) further evaluates both of the term to determine if both are integer values.

6. The method as defined in claim 1, wherein the exponentials are computed in connection with lighting spotlights and specular reflections.

7. The method as defined in claim 1, wherein the evaluating step (b) evaluates shininess exponent values for all vertices of a graphic primitive.

8. The method as defined in claim 1, wherein the evaluating step (b) evaluates spotlight exponents for all light sources associated with a graphic primitive.

9. The method as defined in claim 1, wherein the floating point exponentiation routine of step (f) further includes the steps of:
   utilizing a first look-up table to retrieve predefined values that approximate log2(a);
   multiplying the approximated log2(a) by x to obtain an intermediate result;
   separating the intermediate result into a fractional component and an integer component;
   computing $2^{integer}$, where integer is the integer component;
   utilizing a second look-up table to retrieve a predefined value for $2^{fract}$, where fract is the fractional component; and
   multiplying the retrieved value of $2^{fract}$ by the computed value of $2^{integer}$ to obtain a final result.

10. The method as defined in claim 1, wherein the receiving step (a) retrieves values previously received from a central processing unit (CPU) and stored in memory.

11. A system for computing exponentials of a lighting equation in a geometry accelerator comprising:
   receiving means for receiving values for a first term "a" and a second term "x" of an exponential in the form $a^x$;
   evaluating means for evaluating at least one of the first and second terms to determine whether the at least one term is an integer value;
   bit setting means responsive to the evaluating means for setting a bit in a memory location;
   examining means for examining a bit in the memory location;
   integer means responsive to the examining means for executing an integer exponentiation routine to calculate $a^x$; and
   floating point means responsive to the examining means for executing a floating point exponentiation routine to closely approximate the calculation of $a^x$.

12. The system as defined in claim 11, wherein the memory location is part of a control register.

13. The system as defined in claim 12, wherein the control register includes a plurality of bits.

14. The system as defined in claim 13, wherein the register includes bits representative of vertex shininess and lighting spotlights.

15. The system as defined in claim 11, wherein the exponentials are computed in connection with lighting spotlights and specular reflections.

16. A system for computing exponentials of a lighting equation in a geometry accelerator comprising:
   a receiver configured to receive values for a first term "a" and a second term "x" of an exponential in the form $a^x$;
   an evaluator configured to evaluate at least one of the first and second terms to determine whether the at least one term is an integer value;
   a bit setting mechanism responsive to the evaluator, the bit setting mechanism configured to set a bit in a memory location;
   an examining mechanism configured to examine a bit in the memory location;
   an integer computation routine responsive to the examining mechanism and configured to calculate $a^x$; and
   a floating point computation routine responsive to the examining means and adapted to closely approximate the calculation of $a^x$.

17. A computer readable storage medium containing program code for controlling the computation of exponentials of a lighting equation in a geometry accelerator comprising the steps of:
   (a) receiving values for a first term "a" and a second term "x" of an exponential in the form $a^x$;
   (b) evaluating at least one of the first and second terms to determine whether the at least one term is an integer value;

(c) if the evaluating step determines that the at least one of the terms is an integer value, then setting a bit in a memory location;

(d) examining a bit in the memory location;

(e) if the bit is set, then executing an integer exponentiation routine to calculate $a^x$;

(f) if the bit is not set, then executing a floating point exponentiation routine to closely approximate the calculation of $a^x$; and (g) using the calculated result of $a^x$ to compute the lighting equation in the geometry accelerator.

* * * * *

UNITED STATES PATENT AND TRADEMARK OFFICE
CERTIFICATE OF CORRECTION

PATENT NO.   : 5,912,830
DATED        : June 15, 1999
INVENTOR(S)  : Alan S. Krech, Jr.

It is certified that error appears in the above-identified patent and that said Letters Patent is hereby corrected as shown below:

Column 17,
Line 15, delete " form a" and insert therefor -- form $a^x$ --

Signed and Sealed this

Eleventh Day of June, 2002

Attest:

JAMES E. ROGAN
Attesting Officer        Director of the United States Patent and Trademark Office